June 2, 1964     T. A. SPANKE ETAL     3,135,123
ARTICLE POSITIONING APPARATUS
Filed May 4, 1961     4 Sheets—Sheet 4
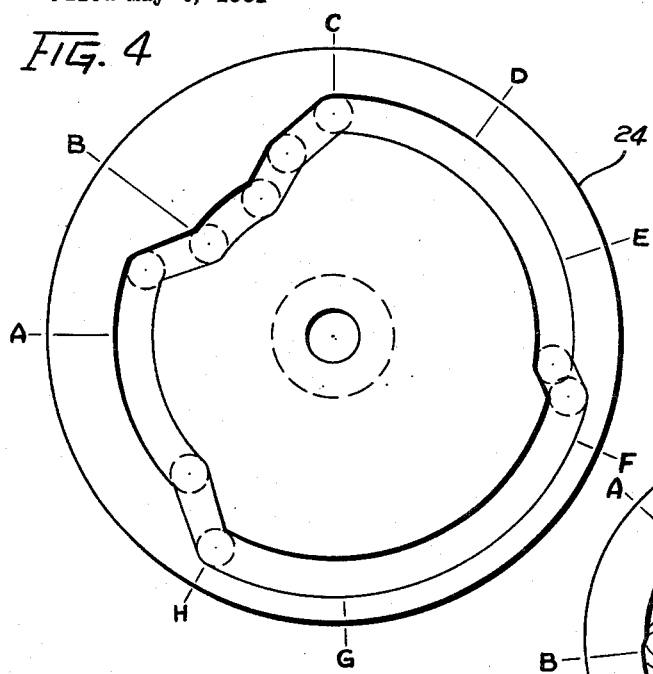
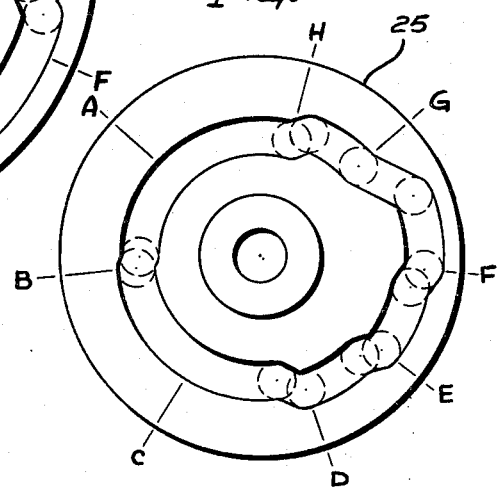
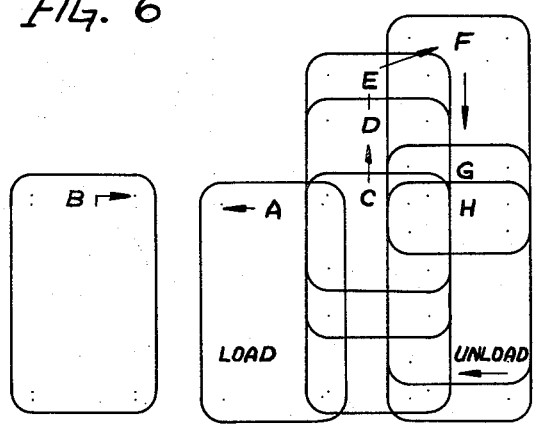
INVENTORS
T.A. SPANKE
A.L. VAN NEST
BY
ATTORNEY

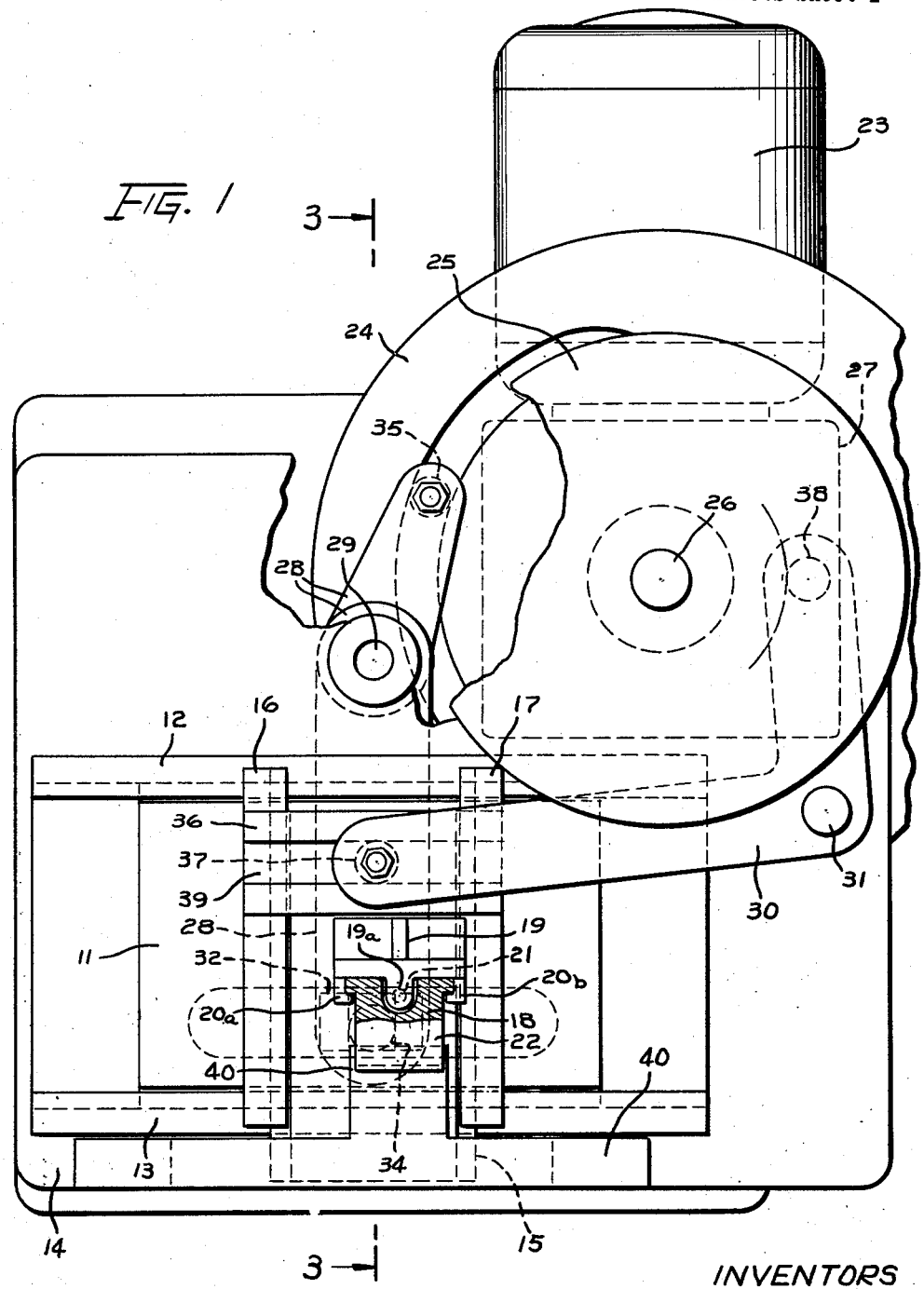

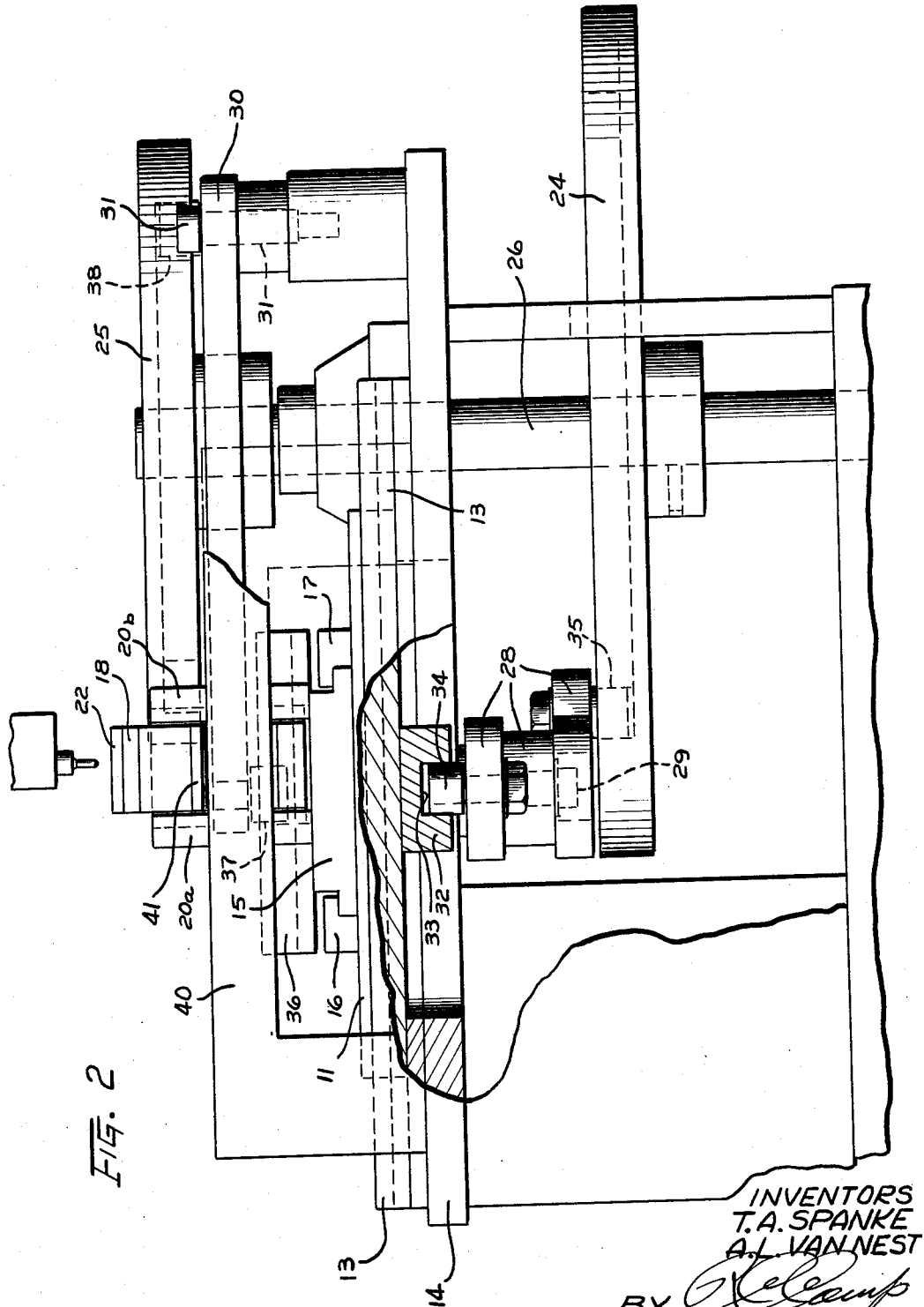

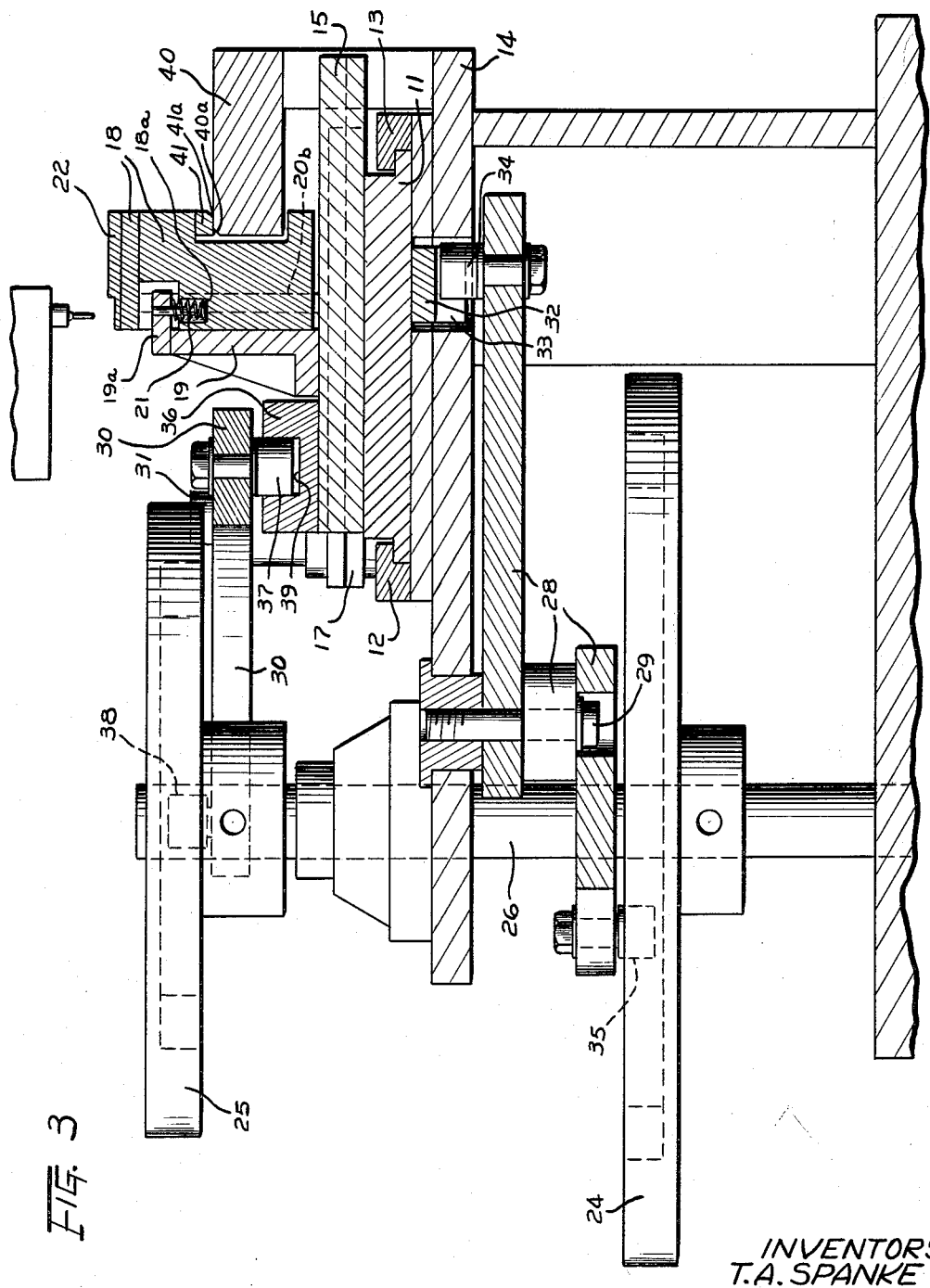

United States Patent Office 3,135,123
Patented June 2, 1964

3,135,123
ARTICLE POSITIONING APPARATUS
Theodore A. Spanke and Arden L. Van Nest, Indianapolis, Ind., assignors to Western Electric Company, Incorporated, a corporation of New York
Filed May 4, 1961, Ser. No. 107,695
7 Claims. (Cl. 74—53)

This invention relates to an apparatus for providing two or three dimensional positioning and more specifically to an apparatus for reciprocably moving an article along two linear paths in a first plane and, if desired, along a third linear path generally perpendicular to the first plane, wherein the movements in the first plane are independent of each other and the paths of movement are angularly displaced substantially with respect to each other and wherein the movement along the third linear path is dependent on movement in the first plane.

In the preferred embodiment of the invention, utilized as a three-dimensional positioning apparatus, a first carriage is mounted on a base member and is reciprocably movable thereon along a first linear path in a first plane. A second carriage is mounted on the first carriage and is reciprocably movable thereon along a second linear path in the first plane which is angularly displaced substantially from the path of movement of the first carriage. An article-positioning carriage is mounted on the second carriage and is reciprocably movable thereon along a linear path which is perpendicular to the first plane. The first and second carriages are reciprocated by the same driving means which is mounted on the base member and these carriages are connected to the driving means by suitable connector members such as bell cranks. The connector member for connecting the second carriage to the driving means is slidably secured in a guideway on the second carriage, which guideway extends parallel to the path of movement of the first carriage and therefore permits reciprocation of the first carriage without inducing movement of the second carriage with respect to the first carriage. The article-positioning carriage slidably engages the base member through camming apparatus which causes the article-positioning carriage to be reciprocated along the third path of movement in response to predetermined movements of the first and second carriages. This apparatus may be utilized as a two-dimensional positioning apparatus by using only the first and second carriages. In a two-dimensional positioning apparatus, the second carriage becomes the work-positioning carriage.

An object of this invention is to provide an improved, simple, and economical two-dimensional positioning apparatus.

An additional object of this invention is to provide an improved apparatus for accomplishing independent movement of an article along two linear paths angularly displaced substantially with respect to each other.

Another object of this invention is to provide an improved apparatus utilizing a single driving means mounted on a common base for independently moving an article along two linear paths angularly displaced substantially with respect to each other.

A further object of this invention is to provide an improved, simple, and economical three-dimensional positioning apparatus.

A still further object of this invention is to provide an improved apparatus for accomplishing independent movement of an article along two linear paths angularly displaced substantially with respect to each other in one plane and movement along a third linear path, which is perpendicular to the one plane, determined by the movement of the article along the linear paths in the one plane.

FIG. 1 is a plan view of a two or three dimensional positioning apparatus embodying the principal features of this invention having a portion broken away to illustrate structural details;

FIG. 2 is a front elevational view of the apparatus in FIG. 1 having a portion broken away to illustrate structural details;

FIG. 3 is a cross-sectional view taken along the line 3—3 of FIG. 1;

FIG. 4 shows the face of a cam element having a cam track formed therein for determining the movement of one of the carriages employed in the apparatus of FIGS. 1–3;

FIG. 5 shows the face of a second cam element having a cam track formed therein for determining movement of a second one of the carriages employed in the apparatus of FIGS. 1–3; and FIG. 6 is a diagram of the path of movement of a workpiece when the cams in FIGS. 4 and 5 are utilized for two dimensional positioning in one plane.

Referring now in detail to the drawings and more specifically to FIGS. 1, 2, and 3, a first carriage 11 is mounted on a base member 14 and is confined by a pair of gibs 12 and 13, which define a first linear guideway, to linear reciprocatory movement in a horizontal plane with respect to the base. A second carriage 15 is mounted on the first carriage 11 through a pair of gibs 16 and 17, which define a second linear guideway, to move linearly and reciprocably, in the horizontal plane, with respect thereto. A work-positioning carriage 18 is mounted on the second carriage 15 through a bracket 19 having a pair of gibs 20A and 20B to move linearly and reciprocably, in a vertical direction, with respect to the second carriage. The work-positioning carriage is normally retained in engagement with the second carriage 15 by a compression spring element 21 which is positioned in a vertical bore 18A in the work-positioning carriage and is compressed between the bottom of the vertical bore and the underside of a flange 19A projecting from the bracket 19. The work-positioning carriage 18 is provided with means for supporting a workpiece 22 such as a piece part, upon which an operation may be performed, or a work tool, for performing an operational function on a piece part. It is intended that the term "work-positioning carriage" be interpreted to include these alternatives and the equivalents thereof where the term is used hereinafter.

The gibs 16 and 17 are mounted in an angularly displaced relationship with respect to the gibs 12 and 13 in the horizontal plane so that the direction of movement of the second carriage 15 is angularly displaced substantially from the direction of movement of the first carriage 11. Preferably, as in the illustrated embodiment of the invention, the directions of movement of the carriages are perpendicular to each other since this arrangement permits movement of the second carriage between various extreme positions with a minimum length of movement of each carriage. The work-positioning carriage 18 is mounted on the second carriage for movement in a vertical plane so that operations may be performed on a workpiece having various levels.

Both carriages 11 and 15 are driven by a single motor 23 which is mounted on the base member 14. A pair of cam elements 24 and 25, having cam grooves formed therein, are mounted on a common driving shaft 26 which is connected through a gear box 27 to the motor 23. The cam element 24 is connected to the first carriage 11 by a bell crank 28, which is pivoted about a pivot pin 29, and the cam element 25 is connected to the second carriage 15 by a bell crank 30, which is pivoted about a pivot pin 31.

A track 32, defining a linear groove 33, is provided on the underside of the carriage 11 to accommodate an actuator roller 34, which is attached to one extremity of the bell crank 28, and the opposite extremity of the bell crank 28 has a cam follower roller 35 attached thereto, which is adapted to follow the contour of the cam groove of the cam element 24. A track 36, also defining a linear groove (or guideway) 39, is provided on the top side of the second carriage 15 to accommodate an actuator roller 37, which is attached to one extremity of the bell crank 30, and the opposite extremity of the bell crank 30 also has a cam follower roller 38 attached thereto, which is adapted to follow the contour of the cam groove of the cam element 25.

The second carriage 15 moves with the first carriage 11 as movement is imparted to the first carriage, since the second carriage is mounted on the first carriage, and the work-positioning carriage 18 moves with the second carriage 15 as movement is imparted to the second carriage, since the work-positioning carriage is mounted on the second carriage. It is an important feature of this invention that the first carriage may be reciprocated along the linear path determined by gibs 12 and 13 without effecting movement of the second carriage along the linear path determined by gibs 16 and 17. As previously discussed, the carriage driving means is connected to the second carriage by the bell crank 30, which has an actuator roller 37 connected to one extremity, and the actuator roller is adapted to ride in the groove 39 defined by the track 36, which is mounted on the second carriage.

The track 36 is positioned on the second carriage so that the groove 39 extends parallel to the path of movement of the first carriage, determined by gibs 12 and 13. The second carriage is therefore free to move along this path with the first carriage and to do this without transverse movement being imparted to the second carriage by the actuator roller 37. This follows since, when the second carriage moves with the first carriage, the track 36 is displaced relative to the actuator roller 37 only in a linear direction parallel to the direction in which the groove 39 extends and not laterally thereof, so that no transverse force is applied to the actuator roller 37 and no relative transverse movement is imparted to the second carriage.

A cam element 40 having a camming surface 40a, which is beveled to provide various levels, is secured in a fixed position on the base member 14 having a camming surface 41a, and a cam follower 41 is secured to the underside of the work-positioning carriage for slidably engaging the cam element 40. As the work-positioning carriage is moved along linear paths in the horizontal plane with the second carriage 15, the camming surface 41a of the cam follower 41 is moved into engagement with the camming surface 40a of the cam element 40 and, when the cam follower is moved relative to the cam element so that the camming surface 41a is caused to ride up the camming surface 40a, the work-positioning carriage will be caused to move to different levels along its vertical path of movement which correspond to the various levels of the workpiece to have work performed thereon. Since the compression spring element 21 tends to force the work-positioning carriage back to its normal position, i.e. in engagement with the carriage 15, the cam follower 41 is retained in engagement with the cam element 40 by this compression spring element and thus the cam follower follows the contour of the cam element.

In accordance with one application of the invention, such as positioning a piece part beneath an eyeletting machine which is operated to insert a plurality of eyelets in a preconcerted array within the piece part, the shaft 26 is rotated by operation of the motor 23, which causes the cam elements 24 and 25 to rotate. As these cam elements 24 and 25 rotate, the cam follower rollers 35 and 38, attached to one extremity of the bell cranks 28 and 30, follow the contour of the cam grooves of the cam elements 24 and 25 and cause the bell cranks to be selectively pivoted about their pivot pins 29 and 31.

As the bell crank 28 pivots about its pivot pin 29, a force will be exerted against one of the sides of the track 32, to the right or left as viewed in FIG. 2, provided on the underside of the first carriage 11, through the actuator roller 34, and this force will impart a movement to the first carriage 11 along its horizontal path of movement between gibs 12 and 13. The direction of movement of the first carriage 11 is dependent on the direction in which the bell crank 28 is caused to pivot about its pivot pin 29, in response to the movement of the cam follower roller 35 along the contour of the cam groove of the cam element 24. As the first carriage 11 moves along its path of movement, the second carriage moves with it since it is mounted on the first carriage. As previously set forth, when the second carriage 15 moves with the first carriage, the track 36 mounted on the first carriage is displaced relative to the actuator roller 37 in a linear horizontal direction parallel to the direction in which the groove 39 of the track 36 extends and not laterally thereof, so that no lateral force is applied to the actuator roller 37 and no relative transverse movement will be imparted to the second carriage.

As the bell crank 30 pivots about its pivot pin 31, a force will be exerted against one of the sides of the track 36, to the right or left as viewed in FIG. 3, provided on the top side of the second carriage 15, through the actuator roller 37, and this force will impart a movement to the second carriage along its horizontal path of movement between the gibs 16 and 17. The direction of movement of the second carriage is dependent on the direction in which the bell crank 30 is caused to pivot about its pivot pin 31, in response to the movement of the cam follower roller 38 along the contour of the cam groove of the cam element 25. Movement of the second carriage 15 will have no effect on the first carriage 11 since the second carriage moves between the gibs 16 and 17 which are mounted on top of the first carriage. The work-positioning carriage 18, however, will move with the second carriage 15, in the horizontal plane, since the work-positioning carriage is mounted on top of the second carriage.

The bell cranks 28 and 30 will not pivot about their pivot pins 29 and 31 unless there is a change in the radius of the cam grooves of the cam elements 24 and 25 as illustrated in FIGS. 4 and 5, and as the radii of the cam grooves remain constant, the bell cranks will remain stationary and no moving force will be imparted to the carriages 11 and 15. FIGS. 4 and 5 illustrate a pair of typical cam elements which may be utilized for the positioning operation to determine the position of a workpiece in the horizontal plane, and FIG. 6 illustrates the path of movement a workpiece will follow in the horizontal plane when the cam elements illustrated in FIGS. 4 and 5 are utilized. It will be apparent to those skilled in the art that simultaneous movement of the cam follower rollers 35 and 38 along the cam grooves of the cam elements 24 and 25 may produce a horizontal movement of the workpiece suggested by the diagram of FIG. 6. Since the specific sequence of movements does not, in and of itself, constitute a feature of the present invention, FIGS. 4, 5, and 6 are not described in further detail herein. It should be noted, however, that since the cam grooves are provided with dwells at each radius corresponding to a work position, the cam may rotate continuously and the desired work operation may be performed during the time that the cam follower rollers pass along corresponding dwell portions of the cam tracks. Alternatively, the cams may be stopped when the work-positioning carriage reaches successive stations.

As the work-positioning carriage 18 is caused to move along the linear paths in the horizontal plane with the second carriage 15 (to the right as viewed in FIG. 3, toward the solid line position shown), the cam follower 41 mounted on the underside of the work-positioning carriage is caused to move into engagement with the cam element 40. Since the camming surface 40a of the cam element 40 is beveled to provide various levels (only two levels being shown for the single-stepped workpiece 22 illustrated), the work-positioning carriage 18 is moved along a vertical linear path in response to the movement of the camming surface 41a of the cam follower 41 along the camming surface 40a of the cam element 40 so that the work-positioning carriage is moved to various levels corresponding to the various levels of the workpiece. Since the compression spring element 21 tends to force the work-positioning carriage into engagement with carriage 15, the cam follower is retained in engagement with the cam element by this compression spring and the cam follower will be caused to follow the contour of the cam element. Thus, the vertical movement of the work-positioning carriage 18 is dependent on the horizontal movement of the second carriage in the horizontal plane, although the camming member 40 could also be beveled in a direction perpendicular to the bevel illustrated to be responsive to movement of the first carriage.

It is an important characteristic of the present invention that a pair of carriages may be automatically and independently moved along angularly displaced linear paths by a single driving means. A second carriage is mounted on a first carriage and both carriages are driven from the base which supports the first carriage. Movement of the first carriage will not affect the position of the second carriage on the first carriage since the driving means for the second carriage is slidably secured in a track on the second carriage which extends parallel to the path of movement of the first carriage.

It is also an important characteristic of this invention that a workpiece may be moved along two horizontal linear paths and a vertical linear path, wherein the movements in the horizontal plane are independent of each other and the paths of movement are angularly displaced substantially with respect to each other, and movement in the vertical plane is dependent on the movements in the horizontal plane.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. Three-dimensional positioning apparatus, which comprises a first carriage mounted on a base member for reciprocable movement thereon along a first linear path in a first plane, a second carriage mounted on said first carriage for movement therewith and for independent reciprocable movement thereon along a second linear path in the first plane angularly displaced substantially with respect to the first linear path, a work-positioning carriage mounted on said second carriage for movement therewith and for independent reciprocable movement thereon along a linear path in a direction perpendicular to the first plane, a single driving means mounted on the base member for causing said first and second carriages to be moved in predetermined patterns along the linear paths of movement, a first linking means connecting said first carriage to said driving means, a second linking means slidably secured in a guideway on said second carriage and connecting said second carriage to said driving means, the guideway extending parallel to the first linear path so that said first carriage may be moved without causing said second carriage to be displaced along the second linear path, and camming means connecting said work-positioning carriage to the base member for causing said work-positioning carriage to be moved in a predetermined pattern along the linear path of movement perpendicular to the first plane in response to predetermined linear movements of said first and second carriages.

2. Three-dimensional positioning apparatus, which comprises a first carriage mounted on a base member for reciprocable movement thereon along a first linear path in a first plane, a second carriage mounted on said first carriage for movement therewith and for independent reciprocable movement thereon along a second linear path in the first plane angularly displaced substantially with respect to the first linear path, a work-positioning carriage mounted on said second carriage for movement therewith and for independent reciprocable movement thereon along a linear path in a direction perpendicular to the first plane, a single driving means mounted on the base member for causing said first and second carriages to be moved in predetermined patterns along the linear paths of movement, a first linking means connecting said first carriage to said driving means, a second linking means slidably secured in a guideway on said second carriage and connecting said second carriage to said driving means, the guideway extending parallel to the first linear path so that said first carriage may be moved without causing said second carriage to be displaced along the second linear path, a fixed cam member mounted on the base member, and camming means connected to said work-positioning carriage for engaging said fixed cam member and causing said work-positioning carriage to be moved in a predetermined pattern along the linear path of movement perpendicular to the first plane in response to predetermined linear movements of said first and second carriages.

3. Three-dimensional positioning apparatus, which comprises a first carriage mounted on a base member for reciprocable movement thereon along a first linear path in a first plane, a second carriage mounted on said first carriage for movement therewith and for independent reciprocable movement thereon along a second linear path in the first plane angularly displaced substantially with respect to the first linear path, a work-positioning carriage mounted on said second carriage for movement therewith and for independent reciprocable movement thereon along a linear path in a direction perpendicular to the first plane, said work-positioning carriage connected to said second carriage by resilient spring means which normally retains said work-positioning carriage in engagement with said second carriage, a single driving means mounted on the base member for causing said first and second carriages to be moved in predetermined patterns along the linear paths of movement, a first linking means connecting said first carriage to said driving means, a second linking means slidably secured in a guideway on said second carriage and connecting said second carriage to said driving means, the guideway extending parallel to the first linear path so that said first carriage may be moved without causing said second carriage to be displaced along the second linear path, a fixed cam member mounted on the base member, and camming means connected to said work-positioning carriage for engaging said fixed cam member and for overcoming the effect of the resilient spring means to cause said work-positioning carriage to be moved in a predetermined pattern along the linear path of movement perpendicular to the first plane in response to predetermined linear movements of said first and second carriages.

4. Three-dimensional positioning apparatus, which comprises a first carriage mounted in a first linear guideway on a base member for reciprocable movement therein in a first plane, a second carriage mounted in a second linear guideway on said first carriage for movement with said first carriage and for independent reciprocable movement in the second linear guideway in the first plane, the second linear guideway so positioned that said second carriage moves transversely with respect to said first carriage, a work-positioning carriage mounted in a third linear guideway on said second carriage for movement with said second carriage and for independent reciprocable movement in the third linear guideway along a linear path in a direction perpendicular to the first plane, said work-positioning carriage connected to said second carriage by resilient spring means which normally retains said work-positioning carriage in engagement with said second carriage, a single driving means mounted on the base member, first and second cam means mounted on the driving shaft of said driving means for determining the patterns of movement of said first and second carriages along the linear guideways, a first bell crank connecting said first carriage to said first cam means, a second bell crank connecting said second carriage to said second cam means and having a connecting pin slidably secured in a linear guideway on said second carriage, the connecting pin guideway extending parallel to the first linear guideway so that said first carriage may be moved without causing said second carriage to be displaced along the second linear guideway, a fixed cam member mounted on the base member, and camming means connected to said work-positioning carriage for engaging said fixed cam member and overcoming the effect of the resilient spring means to cause said work-positioning carriage to be moved in a predetermined pattern along the linear path of movement perpendicular to the first plane in response to predetermined linear movements of said first and second carriages.

5. Two-dimensional positioning apparatus, which comprises a first carriage mounted on a base member for reciprocable movement thereon along a first linear guideway, a work-positioning carriage mounted on said first carriage for movement therewith and for independent reciprocable movement thereon along a second linear guideway, the second linear guideway being angularly displaced substantially with respect to the first linear guideway and extending substantially the width of said first carriage so that said work-positioning carriage may be moved along the second linear guideway a distance substantially equal to the width of said first carriage, driving means mounted on the base member for causing both carriages to be moved in predetermined patterns along the linear guideways, a first linking means connecting said first carriage to said driving means, and a second linking means slidably secured in a linear guideway on said work-positioning carriage and connecting said work-positioning carriage to said driving means, the linking means guideway extending parallel to the first linear guideway so that said first carriage may be moved without causing the work-positioning carriage to be displaced along the second linear guideway and extending substantially the width of said work-positioning carriage so that said first carriage may be moved along the first linear guideway a distance substantially equal to the width of said work-positioning carriage.

6. Two-dimensional positioning apparatus, which comprises a first carriage mounted on a base member for reciprocable movement thereon along a first linear guideway, a work-positioning carriage mounted on said first carriage for movement therewith and for independent reciprocable movement thereon along a second linear guideway, the second linear guideway being angularly displaced substantially with respect to the first linear guideway and extending substantially the width of said first carriage so that said work-positioning carriage may be moved along the second linear guideway a distance substantially equal to the width of said first carriage, a single driving means mounted on the base member, first and second cam means mounted on the driving shaft of said driving means for determining the patterns of movement of said carriages along the linear guideways, a first linking means connecting said first carriage to said first cam means, and a second linking means slidably secured in a linear guideway on said work-positioning carriage and connecting said work-positioning carriage to said second cam means, the linking means guideway extending parallel to the first linear guideway so that said first carriage may be moved without causing said work-positioning carriage to be displaced along the second linear guideway and extending substantially the width of said work-positioning carriage so that said first carriage may be moved along the first linear guideway a distance substantially equal to the width of said work-positioning carriage.

7. Two-dimensional positioning apparatus, which comprises a first carriage mounted in a first linear guideway on a base member for reciprocable movement therein, a work-positioning carriage mounted in a second linear guideway on said first carriage for movement with the carriage and for independent reciprocable movement in the second linear guideway, the second linear guideway so positioned that said work-positioning carriage moves transversely with respect to said first carriage and extending substantially the width of said first carriage so that said work-positioning carriage may be moved along the second linear path a distance substantially equal to the width of said first carriage, a single driving means mounted on the base member, first and second cam means mounted on the driving shaft of said driving means for determining the patterns of movement of said carriages along the linear guideways, a first bell crank connecting said first carriage to said first cam means, and a second bell crank connecting said work-positioning carriage to said second cam means and having a connecting pin slidably secured in a linear guideway on said work-positioning carriage, the connecting pin guideway extending parallel to the first linear guideway so that said first carriage may be moved without causing said work-positioning carriage to be transversely displaced along the second linear guideway and extending substantially the width of said work-positioning carriage so that said first carriage may be moved along the first linear guideway a distance substantially equal to the width of said work-positioning carriage.

References Cited in the file of this patent

UNITED STATES PATENTS

| | | |
|---|---|---|
| 740,318 | Sherf | Sept. 29, 1903 |
| 1,309,301 | Phillippi | July 8, 1919 |
| 2,576,570 | Castelli | Nov. 27, 1951 |
| 2,601,330 | Schmidt | June 2, 1952 |
| 2,698,952 | Escure | Jan. 11, 1955 |

FOREIGN PATENTS

| | | |
|---|---|---|
| 1,035,946 | France | Apr. 22, 1953 |